United States Patent
Sankaran et al.

(10) Patent No.: US 11,016,894 B2
(45) Date of Patent: May 25, 2021

(54) TECHNIQUES TO PROVIDE CACHE COHERENCY BASED ON CACHE TYPE

(71) Applicant: INTEL CORPORATION, Santa Clara, CA (US)

(72) Inventors: Rajesh Sankaran, Portland, OR (US); Ishwar Agarwal, Hillsboro, OR (US); Stephen Van Doren, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 766 days.

(21) Appl. No.: 15/670,171

(22) Filed: Aug. 7, 2017

(65) Prior Publication Data
US 2019/0042430 A1    Feb. 7, 2019

(51) Int. Cl.
*G06F 12/0831* (2016.01)
*G06F 12/084* (2016.01)
*G06F 12/0817* (2016.01)

(52) U.S. Cl.
CPC ........ *G06F 12/0833* (2013.01); *G06F 12/084* (2013.01); *G06F 12/0817* (2013.01)

(58) Field of Classification Search
CPC ......... G06F 2212/1016; G06F 12/0871; G06F 12/0831; G06F 12/084; G06F 12/0833; G06F 12/0817; G06F 12/0815
USPC ........................................................ 711/141
See application file for complete search history.

(56) References Cited

U.S. PATENT DOCUMENTS

| | | | | |
|---|---|---|---|---|
| 6,412,038 B1* | 6/2002 | Mehalel | ............... | G06F 12/0895 365/51 |
| 2007/0028053 A1* | 2/2007 | Shet | ................... | G06F 12/0871 711/129 |
| 2014/0281239 A1* | 9/2014 | Novakovsky | ....... | G06F 12/0831 711/122 |
| 2016/0188471 A1* | 6/2016 | Forrest | ................ | G06F 12/0828 711/119 |
| 2016/0321288 A1* | 11/2016 | Malhotra | ............ | G06F 16/2443 |
| 2017/0139836 A1* | 5/2017 | Dittmann | ............ | G06F 15/7821 |

* cited by examiner

*Primary Examiner* — Hashem Farrokh
(74) *Attorney, Agent, or Firm* — Kacvinsky Daisak Bluni PLLC

(57) ABSTRACT

Techniques and apparatus to manage cache coherency for different types of cache memory are described. In one embodiment, an apparatus may include at least one processor, at least one cache memory, and logic, at least a portion comprised in hardware, the logic to receive a memory operation request associated with the at least one cache memory, determine a cache status of the memory operation request, the cache status indicating one of a giant cache status or a small cache status, perform the memory operation request via a small cache coherence process responsive to the cache status being a small cache status, and perform the memory operation request via a giant cache coherence process responsive to the cache status being a small cache status. Other embodiments are described and claimed.

23 Claims, 9 Drawing Sheets

TECHNIQUES TO PROVIDE CACHE COHERENCY BASED ON CACHE TYPE

TECHNICAL FIELD

Embodiments herein generally relate to information processing, and more particularly, to providing cache coherency techniques within a computing system that support different types of caches.

BACKGROUND

Computing systems typically include various components that are coupled together to interoperate and perform various processing functions under control of a central processor, commonly referred to as a central processing unit (CPU). Most systems also contain a collection of elements, such as processors, processor cores (or "cores"), accelerators, memory devices, peripheral devices, dedicated processing units, and the like, as well as additional semiconductor devices that may act as a system memory to provide storage for information used by the processing units. In many systems, multiple memories may be present, each of which may be associated with a given element, such as a core or accelerator, that may operate as a local memory or cache for the corresponding element. Local caches may be formed of different types of memory devices distinguished based on size, speed, or other operating characteristics.

To maintain the coherency of data across the system, a cache coherency protocol may be implemented, such as a snoop-based protocol, a directory-based protocol, combinations thereof, and/or variations thereof. Each form of coherency protocol may operate differently for certain operating characteristics of local caches of the system elements. For instance, a certain coherency protocol may operate efficiently for a particular cache type, but may operate less efficiently, or even not at all, for other types of caches.

DETAILED DESCRIPTION

Figure 1:
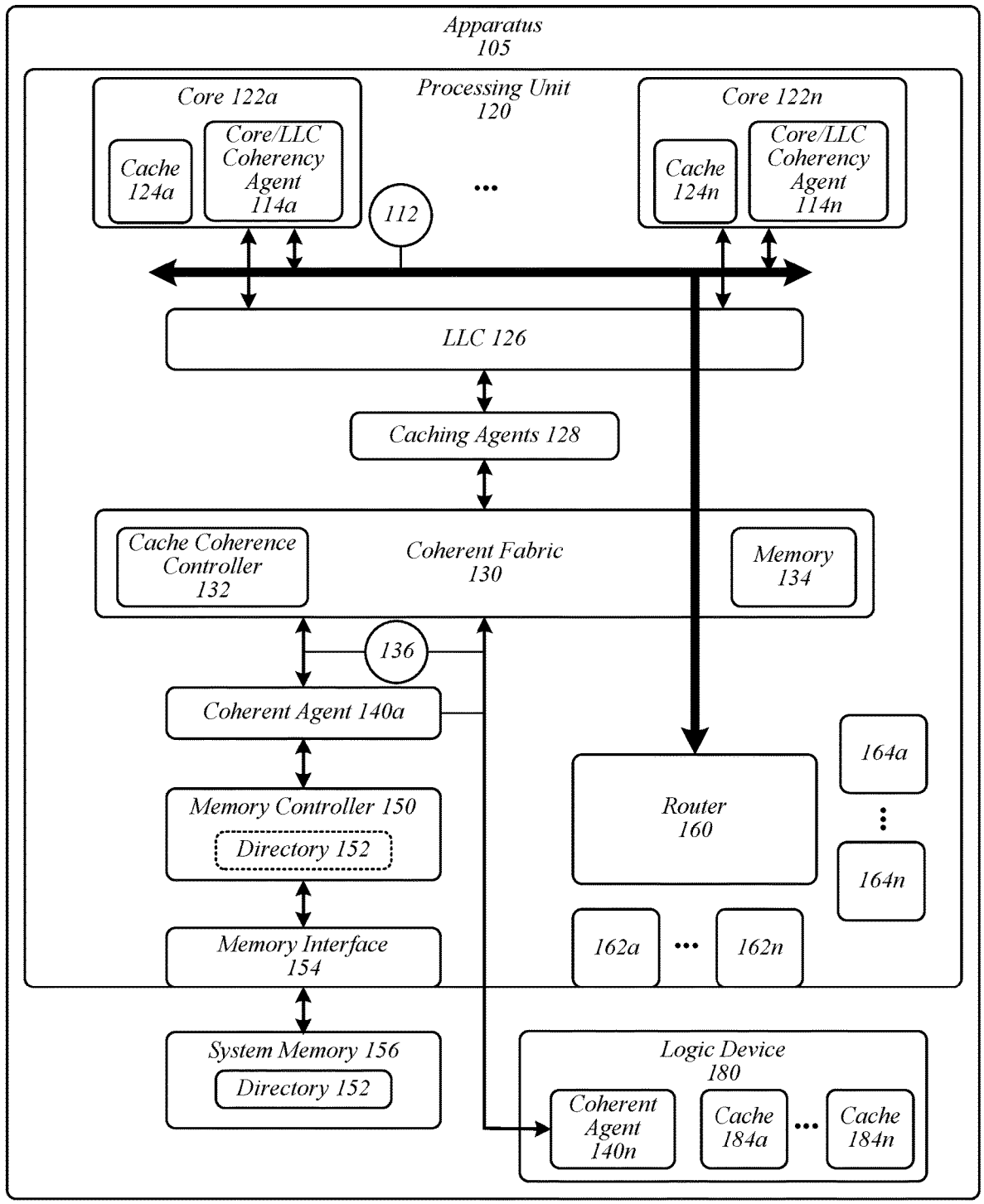
FIG. 1 illustrates an embodiment of a first operating environment.

Various embodiments may be generally directed to techniques for providing at least one cache coherence process between a plurality of components within a processing system. In some embodiments, the cache coherence process may operate within a multi-component (for instance, multi-chip) computing environment to, among other things, track cache lines whose "home" is in an attached memory of a first component (for instance, a first chip) when cached on a second component (for instance, a second chip). In some embodiments, the first chip may include a processor chip. In various embodiments, the second chip may include a processor chip, an accelerator chip, or the like.

In some embodiments, the plurality of components may include a processor, such as a central processing unit (CPU), a processor die (including, for instance, a multi-chip processor die), a processor core (or "core"), an accelerator, an input/output (I/O) device, smart I/O device, a memory device, combinations thereof, and/or the like. In some embodiments, at least a portion of the plurality of components may include and/or may be operably coupled to a memory (a "local memory," "cache memory," or "cache"). The caches of the plurality of components may include one or more cache types based on one or more cache characteristics. Non-limiting examples of cache characteristics may include size, speed, location, associated component, usage, and/or the like. The cache type of a cache may affect the operation of the at least one cache coherence process interacting with the cache. For instance, the at least one cache coherence process may include a first cache coherence process that operates efficiently for a first cache type and operates inefficiently for a second cache coherence process.

In some embodiments, cache type may be based on a size of a cache. For instance, caches may be designated as being one of a "giant cache type" or a "small cache type." In some embodiments, a small cache type may include a cache having a memory size of a typical cache used in a processor core, while a giant cache type may include caches having a size larger than a typical cache used in a processor core or some other size threshold. In various embodiments, a small cache type may have a memory size in a 1 to 10 megabyte (MB) range, while a giant cache type may have a memory size in a 10-100 MB range or a gigabyte (GB) range. In various embodiments, a small cache type may have a memory size of about less than 2 MB to about 12 MB. In some embodiments, a small cache type may have a memory size of about 500 kilobytes (KB), 1 MB, 2 MB, 4 MB, 6 MB, 8 MB, 10 MB, 12 MB, 16 MB, and ranges and values between any two of these values (including endpoints). In various embodiments, a giant cache type may have a memory size of greater than about 10 MB to greater than about 10 GB. In some embodiments, a giant cache type may have a memory size of about 10 MB, 20 MB, 30 MB, 40 MB, 50 MB, 100 MB, 200 MB, 500 MB, 1 GB, 5 GB, 10 GB, 25 GB, 50 GB, 100 GB, 500 GB, and ranges and values between any two of these values (including endpoints). Embodiments are not limited in this context.

In general, the memory size of a small cache type and a giant cache type may depend on the operational characteristics of the corresponding system, including any cache coherence processes. In general, as described in more detail below, certain cache coherence processes or portions thereof may operate efficiently for small cache types, while the certain cache coherence processes or portions thereof may operate inefficiently (or not at all) for giant cache types. For instance, in a first system that uses a first cache coherence protocol, a giant cache type may have a memory size of about 500 MB, while in a second system that uses a second cache coherence protocol, a giant cache type may have a memory size of about 10 GB. In some embodiments, for example, a small cache type and a giant cache type may be differentiated based on the effect that the memory size of a cache has on an operational characteristic of a cache coherence process, such as snoop latency.

For a snoop-based cache coherence protocol, snoop latency for giant cache types (for instance, of an accelerator or smart I/O device) may be very high compared with small cache types of a processor core. Accordingly, giant cache types may be associated with "high snoop latency," and small cache types may be associated with "low snoop latency." If agents with giant cache types are treated as conventional coherence agents, standard cache coherence mechanisms may cause snoop latency of an agent associated with the giant cache type to become a limiter on the memory read latency, for example, as seen by a processor core. Accordingly, standard cache coherence mechanisms for giant cache types typically have a substantial negative effect on processor performance.

Conventional software-based techniques for using standard cache coherence mechanisms for giant cache types generally involves managing data at a low level of granularity. For example, data may be managed at page granularity in which caching a page of data at a coherent agent may require the page to be deallocated from the page tables seen by processor cores. In addition, certain operations, such as an inverse page table operation, may be required when a page is returned from the cache to host memory. Accordingly, such conventional software-based techniques for providing cache coherence for giant caches are extremely inefficient and provide poor performance.

For snoop-based cache coherence systems employing small caches, a random-access memory (RAM), such as a static RAM (SRAM), based snoop filter dedicated to a coherent agent can be implemented, for instance, on a processor die. However, SRAM-based snoop filters cannot be applied to giant caches due to the size of the snoop filter required to map such a giant cache. For instance, such a snoop filter would consume an unacceptably large percentage of the area and power available to a processor die.

Accordingly, some embodiments provide for techniques for supporting a cache coherence process for giant cache types. In some embodiments, the cache coherence process may include snoop-based coherence processes, directory-based coherence processes, combinations thereof, and/or variations thereof. In various embodiments, the cache coherence process may provide multiple coherence flows capable of supporting small cache types and giant cache types within the same or related architecture. For example, in some embodiments, the cache coherence process may extend the state tracked in a coherence directory (for instance, an in-memory server coherence directory) to track a plurality of agents, instead of a single class of agents as provided according to conventional techniques. In various embodiments, the plurality of agents may include agents for giant cache types (or high snoop latency) ("high latency agents") and/or agents for small cache types (or low snoop latency) ("low latency agents"). Agents, for instance, a processor core with a small cache type may use low latency directory bits to track coherency, while agents with a giant cache type may use high latency directory bits to track coherency. In various embodiments, an agent may specify which type of agent to use for a particular request. In this manner, an agent may implement both a giant cache type (or high snoop latency) and a small cache type (or low snoop latency). Accordingly, in some embodiments, coherence for giant cache types may be tracked at least partially in hardware, without the resource-expensive paging-related software activities required for software-based solutions. Therefore, in some embodiments, systems may achieve improved cache coherence performance for giant cache types. For instance, some embodiments may improve cache coherence performance for dense computational logic devices, such as computational accelerators (for instance, graphics processing units (GPU)) and/or high gate-count field-programmable gate arrays (FPGAs), for example, that operate on computations that have a data footprint that is larger than the capacity of their attached memory.

FIG. 1 illustrates an example of an operating environment 100 that may be representative of various embodiments. The operating environment 100 depicted in FIG. 1 may include an apparatus 105 having a processing unit 120, such as a central processing unit (CPU). In some embodiments, processing unit 120 may be implemented on a system-on-a-chip (SoC). In some embodiments, processing unit 120 may be implemented as a standalone processor die. Processing unit 120 may include one or more processing cores 122a-n, such as 1, 2, 4, 6, 8, 10, 12, or 16 processing cores. Embodiments are not limited in this context. Processing unit 120 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processing unit 120 may be one or more processors in the family of Intel® processors available from Intel® Corporation of Santa Clara, Calif., such as an Intel® Xeon® processor. Although only one processing unit 120 is depicted in FIG. 1, apparatus 105 may include a plurality of processing units.

Each of processor cores 122a-n may be connected to a router block 160 via an internal interconnect 112. Router block 160 and internal interconnect 112 may be generally representative of various circuitry that supports communication between components in processing unit 120, including busses, serial point-to-point links, interconnect fabrics, and/or the like. Further details of such connections are not shown so as to not obscure the detail of operating environment 100.

Non-limiting examples of supported communication protocols may include peripheral component interconnect (PCI) protocol, peripheral component interconnect express (PCIe or PCI-E) protocol, universal serial bus (USB) protocol, serial peripheral interface (SPI) protocol, serial AT attachment (SATA) protocol, Intel® QuickPath Interconnect (QPI) protocol, Intel® UltraPath Interconnect (UPI) protocol, Intel's® Optimized Accelerator Protocol (OAP), Intel® Accelerator Link (IAL), intra-device interconnect (IDI) protocol, Intel® On-Chip Scalable Fabric (IOSF) protocol, scalable memory interconnect (SMI) protocol, SMI 3rd generation (SMI3), and/or the like. In some embodiments, link 115 may support an intra-device protocol (for instance, IDI) and a memory interconnect protocol (for instance, SMI3). In various embodiments, link 115 may support an intra-device protocol (for instance, IDI), a memory interconnect protocol (for instance, SMI3), and a fabric-based protocol (for instance, IOSF).

As shown in FIG. 1, processing unit 120 may be communicatively coupled to a logic device 180. In various embodiments, logic device 180 may include a hardware device. In some embodiments, logic device 180 may be implemented in hardware, software, or a combination thereof. In various embodiments, logic device 180 may include an accelerator. In some embodiments, logic device 180 may include a hardware accelerator. In various embodiments, logic device 180 may include an I/O device, such as a smart I/O device. In some embodiments, processing unit 120 may be coupled to a plurality of logic devices. Although an accelerator and a smart I/O device may be used as an example logic device 180, embodiments are not so limited as logic device 180 may include any type of device, processor (for instance, a graphics processing unit (GPU)), logic unit, circuitry, integrated circuit, application-specific integrated circuit (ASIC), FPGA, memory unit, computational unit, and/or the like capable of operating according to some embodiments. For example, in a multi-chip configuration, logic device 180 may include a processing unit the same, similar, or substantially similar to processing unit 120.

Logic device 180 may include or be associated with coherent agent 140n and one or more caches 184a-n. In some embodiments, at least one of caches 184a-n may include a giant cache type. In various embodiments, coherent agents 140a-n may reside on a same processor die as coherent fabric 130 (for instance, coherent agent 140a) or on a companion die coupled to processor die, for example, via a multi-chip package (MCP) or other off-package link (for instance, coherent agent 140n).

As shown in FIG. 1, processing unit 120 may include a local cache formed as a hierarchy, for example, of various levels of caches 124a-n and a last level cache (LLC) 126. In general, caches closest to the processor cores 122a-n have the least latency and smallest size, and the caches further away being larger but having more latency. For example, cores 122a-n may include caches 124a-n, which may be employed as a first-level cache (L1) or as an L1 and second-level cache (L2). Caches 124a-n, or portions thereof, within cores 122a-n may be "private" to each processor core 122a-n. In the context of operating environment 100, the highest-level cache is the LLC 126. For example, LLC 126 for a given core 122a-n may include a third-level (L3) cache if L1 and L2 caches are also employed, or an L2-type cache if the only other cache is an L1 cache. Embodiments are not limited in this context as the cache memory may be extended to further levels of cache.

Each of processor cores 122a-n may also be connected to LLC 126. LLC 126 is depicted as a single logical block in FIG. 1; however, components relating to LLC 126 may be distributed on the processing unit 120 rather than implemented as a single monolithic block or box. In some embodiments, one or more of caches 124a-n and/or LLC 126 may include a small cache type. In some embodiments, one or more of caches 124a-n and/or LLC 126 may include a giant cache type. In various embodiments, caches 124a-n and LLC 126 may include small cache types and at least one of caches 184a-n may include a giant cache type. Accordingly, processing unit 120 may include a local cache formed as a hierarchy formed of a private cache implemented via caches 124a-n inside each of processor cores 122a-n and LLC 126 implemented as a hierarchical layer sitting between a private core cache and system memory 156.

In various embodiments, LLC 126 may be implemented as a single block or box (for instance, shared across each of processor cores 122a-n) or a set of peer LLCs (for instance, shared across a subset of processor cores 122a-n). Each LLC 126 may be implemented as a monolithic agent or as a distributed set of "sliced" agents. Each monolithic LLC or sliced LLC agent may include or be associated with a core/LLC coherency agent 114a-n configured to run, collectively with cache coherency logic, in each processor core 122a-n associated with a given LLC peer of LLC 126. In some embodiments, core/LLC coherency agent 114a-n may provide a coherency process operative to maintain cache coherency between an LLC peer and associated processor cores 122a-n. In various embodiments, core/LLC coherency agent 114a-n may provide cache coherence processes operative to be informed by LLC tag stores that track cache lines stored in LLC data arrays of LLC 126 and snoop filter (SF) tag stores that track cache lines (for instance, at a granularity of 64 B) stored in the associated processor core's 122a-n caches 124a-n. The LLC tags and/or the SF tags may be implemented using various types of memory, such as SRAM on a processor die of processing unit 120. In general, a typical implementation of a high-core count processor (for instance, 30-50 cores) in a 10 nm silicon processor die may include a total of about 100 MB of LLC storage split across a number of LLC peers, and about 100 MB of core private cache split across the cores (in an example including 30-50 cores, providing a private cache of about 1.5-2 MB of private cache per core).

Processing unit 120 may include caching agents 128 and/or coherent agents 140a-n. In some embodiments, coherent agents 140a-n may include an LLC/memory coherency agent arranged between a set of LLC peers on a chip and system memory 126. LLC/memory coherency agent may provide cache coherency processes operative to, among other things, maintain cache coherency between LLC peers of LLC 126. Coherency processes provided by LLC/memory coherency agent may be informed by caching state equivalent to the state captured by the LLC tag store and the SF tag store of the LLC peers of the processing chip of processing unit 120.

As shown in FIG. 1, in some embodiments, at least a portion of caching agents 128 and/or coherent agents 140a-n may be coupled to a coherent fabric 130, which may include various components, such as memory 134, storage (for instance, registers), interfaces, a cache coherence controller 132. In various embodiments, at least a portion of caching agents 128 may be coupled to coherent agents 140a-n without the use of a coherent fabric 130. During normal operation, coherent fabric 130 may route traffic between system agents. The traffic may include snoops in response to cache requests. In some embodiments, coherent fabric 130 may act as a primary on-chip interconnect between a plurality of different agents (for instance, caching agents 128 and/or coherent agents 140a-n) and other components. In various embodiments, coherent fabric 130 may include logic operative to enforce coherency and ordering on the fabric within processing unit 120 based on a cache coherence process. Furthermore, coherent fabric 130 may perform end-to-end routing of packets and/or other data and may also handle all associated functionality, such as network fairness, deadlock avoidance, traffic modulation, among other interconnect functions for agents of processing unit 120.

In some embodiments, caching agents 128 may be responsible for managing data delivery between cores 122a-n and/or logic device 180 and the shared cache 126 and/or caches 184a-n. Caching agents 128 are also responsible for maintaining cache coherency between the cores 122a-n within a single socket (for instance, within processing unit 120) and logic device 180. This may include generating snoops and collecting snoop responses from cores 122a-n in accordance with a cache coherence protocol such as MESI, MOSI, MOESI, or MESIF. Each of the multiple caching agents 128 may be assigned to manage a distinct subset of the shared cache 126

Caching agents 128 may include any agent that may cache one or more cache blocks. For example, the cores 122a-n may be caching agents, as may the caches 124a-n. Coherent fabric 130 and/or cache coherence controller 132 may facilitate coherent communication within apparatus 105. Coherent communication may be supported within apparatus 105 during address, response, and data phases of transactions. In general, a transaction is initiated by transmitting the address of the transaction in an address phase, along with a command indicating which transaction is being initiated and various other control information. Coherent agents 140*a-n* use the response phase to maintain cache coherency. Each coherent agent 140*a-n* may respond with an indication of the state of the cache block addressed by the address, and may also retry transactions for which a coherent response cannot be determined. Retried transactions are cancelled, and may be reattempted later by the initiating agent. The order of successful (non-retried) address phases may establish the order of transactions for coherency purposes (for example, according to a sequentially-consistent model). The data for a transaction is transmitted in the data phase. Some transactions may not include a data phase. For example, some transactions may be used solely to establish a change in the coherency state of a cached block. Generally, the coherency state for a cache block may define the permissible operations that the caching agent may perform on the cache block (for example, reads, writes, and/or the like). Common coherency state schemes include MESI, MOESI, and variations on these schemes.

Coherent agents 140*a-n* (one or more of which may be referred to as a "home" agent) may be connected to a memory controller 150. In some embodiments, caching agents 128, one or more of home agents 140*a-n*, and memory controller 150 may work in concert to manage access to system memory 156. The actual physical memory of memory 156 may be stored on one or more memory modules (not shown) and accessed from memory controller 150 via a memory interface. For example, in one embodiment a memory interface may include one or more double data rate (DDR) interfaces, such as a DDR type 3 (DDR3) interface. In some embodiments, memory controller 150 may include a RAM (for instance, dynamic RAM (DRAM)) memory controller.

Coherent agents 140*a-n* may interact with caching agents 128 to manage cache line usage by various memory consumers (for instance, processor cores 122*a-n*, logic device 180, and/or the like). In particular, coherent agents 140*a-n* and caching agents 128, alone or via coherent fabric 130, may support a coherent memory scheme under which memory can be shared in a coherent manner without data corruption. To support this functionality, coherent agents 140*a-n* and caching agents 128 access and update cache line usage data stored in a directory 152 (see, for example, FIG. 5), which is logically depicted in memory controller 150 (for instance, part of the logic employed by memory controller 150 relates to usage of directory 152 data) but whose data may be stored in system memory 156.

Cache memory in apparatus 105 may be kept coherent using various cache coherence protocols, such as a snoopy-based protocol, a directory-based protocol, combinations thereof, and/or combinations thereof, such as MESI, MOSI, MOESI, MESIF, directory assisted snoopy (DAS), I/O directory cache (IODC), home snoop, early snoop, snoop with directory and opportunistic snoop broadcast, cluster-on-die, and/or the like. In general, a system memory address may be associated with a particular location in the system. This location may generally be referred to as the "home node" of the memory address. In a directory-based protocol, caching agents 128 may send requests (for instance, via coherent fabric 130) to the home node for access to a memory address with which a coherent agent (or home agent) 140*a-n* is associated. Caching agents 128 are, in turn, responsible for ensuring that the most recent copy of the requested data is returned to the requestor either from memory 156 or a caching agent 128 which owns the requested data. The coherent agent 140*a-n* may also be responsible for invalidating copies of data at other caching agents 128 if the request is for an exclusive copy, for example. For these purposes, a coherent agent 140*a-n* generally may snoop every caching agent 128 or rely on directory 152 to track a set of caching agents 128 where data may reside.

In some embodiments, apparatus 105 may provide coherency using a cache coherence process. Cache coherence process may include a plurality of cache coherence protocols, functions, data flows, and/or the like. In various embodiments, cache coherence process may include a directory-based cache coherence protocol. In a directory-based cache coherence protocol, agents that guard the memory, such as coherence agents 140*a-n* (or home agents), collectively maintain directory 152 that tracks where and in what state each cache line is cached in the system. Caching agents 128 that seeks to acquire a cache line may send a request to coherent agents 140*a-n* (for instance, via coherent fabric 130), which perform a look-up in directory 152 and send messages, commonly referred to as snoops, to only those caching agents 128 which the directory 152 indicates may have cached copies of the cache line.

Directory 152 may store directory information (or coherency information). Memory controller 150 and/or cache coherence controller 132 may maintain the directory state of each line in memory in directory 152. In response to some transactions, the directory state of a corresponding line can change. Memory controller 150 and/or cache coherence controller 132 can update records identifying the current directory state of each line in memory. In some cases, Memory controller 150 and/or cache coherence controller 132 can receive data from a coherent agent 140*a-n* to indicate a change to the directory state of a line of memory. In other instances, Memory controller 150 and/or cache coherence controller 132 may include logic to automatically update the directory state (for instance, without a host indicating the change) based on the nature of a corresponding request. In various embodiments, a directory read is performed utilizing a request address to determine if the request address hits or misses in directory 152, and if the memory address hits, the coherency state of the target memory block. The directory information, which may include one directory state for each cache line in the system, may be returned by directory 152 in a subsequent cycle.

In various embodiments, directory information may include bits or other data, such as information stored in error correction code (ECC) bits of memory entries corresponding to requested data. In some embodiments, directory information may include 2 bits encoded as follows: invalid—no cache copies, clean—clean copies cached in a memory location, dirty—dirty copy cached in a memory location, and unused. In various embodiments, directory information may include two sets of two-bit directory state. In some embodiments, directory information may include 2 bits or 4 bits stored with the data, for instance, as part of the ECC bits. The number of bits for a directory 152 entry may include 2 bits, 4 bits, 6 bits, 8 bits, 10 bits, 12 bits, 16 bits, 20 bits, 32 bits, and any value or range between any two of these values (including endpoints). In some embodiments, the directory information may include various fields. Non-limiting examples of fields may include a tag field that identifies the real address of the memory block held in the corresponding cache line, a state field that indicate the coherency state of the cache line, inclusivity bits indicating whether the memory block is held in the associated L1 cache, and cache status information. In some embodiments, the directory may include a state (or state information) to identify the exact one cache that has a copy of data if only one copy exists, a specific set of caching agents in which a copy of data may be found, a state (or state information) to indicate a number of copies (for instance, 1 copy, 2 copies, multiple copies, and/or the like), and/or an indicator for the type of caching agent.

In some embodiments, directory information may include cache status or cache status information. In some embodiments, cache status information may indicate a type of memory operation, cache coherence process, coherence operation, and/or the like. For instance, cache status information may indicate whether a cache coherence process is to support a giant cache type, a small cache type, and/or the like. In this manner, directory 152 may support coherence tracking of multiple classes of agents (for instance, coherent agents or home agents). Non-limiting classes of agents include giant cache agents (high latency agents) operative to support coherence for giant cache types and small cache agents (low latency agents) operative to support coherence for small cache types. In some embodiments, giant cache agents and/or small cache agents may include coherent agents 140a-n (or home agents). In various embodiments, a cache coherence process may include a small cache coherence process and a giant cache coherence process. Apparatus 105 or components thereof may follow the small cache coherence process responsive to the cache status indicating a small cache status, and apparatus 105 or components thereof may follow a giant cache coherence process responsive to the cache status indicating a giant cache status.

In some embodiments, a giant cache agent may include a coherent agent 140a-n operative as an agent for a giant cache type. For example, coherent agent 140n may be a giant cache agent for a giant cache of logic device 180. In another example, coherent agent 140a may be a small cache agent for a small cache of core 122a (for instance, cache 124a). In some embodiments, processing unit 120 may include a giant cache. In some embodiments, logic device 180 may include a giant cache. In some embodiments, processing unit 120 and logic device 180 may include a giant cache. Embodiments are not limited in this context.

In various embodiments, cache status information may include or use additional directory bits per directory entry to encode a cache status (for instance, a small cache status or a giant cache status) per directory entry. For example, cache status information may include 2 additional directory bits per directory entry to provide a 2-bit directory encoding field per agent class per directory entry. In some embodiments, 4 bits or encodings (such as from conventional Xeon® directory encodings) to track giant cache status, two bits or encodings to track small cache status, and remaining bits or encodings to track "uncached" states.

In some embodiments, apparatus 105 may be arranged in a multi-chip (or multi-socket) configuration, for example, in which logic device 180 is a processor, processing unit, processor die, CPU, and/or the like the same, similar to, or substantially similar to processing unit 120. In some embodiments, logic device 180 may be or may include a plurality of companion processor dies, such as 2, 4, or 8 dies. In some embodiments in which logic device is a companion processor die, all of the processor local sets of peer LLCs may combine to create a single large set of LLC peers across all chips. In such embodiments, LLC/memory coherency agents may be responsible for maintaining coherency across all peers using cache coherency processes according to some embodiments. For example, LLC/memory coherency agents may use a UPI, UPI-based, or UPI-derived cache coherency process according to some embodiments.

In a multi-chip configuration, LLC/memory coherency agents (or the cache coherency processes performed thereby) need to be informed by the same equivalent of the LLC tag and SF tag information the same or similar to as described hereinabove. However, in a multi-chip configuration, every cache coherency process on every LLC/memory coherency agent on every chip needs to be informed by the equivalent of the LLC state and SF state on every chip in the configuration.

In a conventional system, if every chip of a multi-chip system included the tag stores for every other chip, the size of the total tag store per chip could grow by up to a factor of 8 (for an 8 processor die architecture), and would either force the chip to grow or decrease the amount of SRAM that can be used as cache (and, would add overhead power to each chip). Also, in terms of scalability, if a chip was built to support up to 8 chip configurations, but was used in 2 and 4 chip configurations as well, then half or ¾ of the aggregate tag state (and associated area) would be wasted (for instance, would not be used for cache or other functional uses) in 4 and 2 chip configurations, respectively.

Due to such scalability and cost issues, most solutions known in the art use various different schemes such as tag (directory) caching, coarse grain coherency, full directory, and/or the like. In tag caching, each chip keeps a relatively small cache of the tag state of peer LLCs. Tag caching may address certain aspects of the cost and scalability problem, but limits the amount of data that can be cached in other chips and limits performance, while still requiring the addition of extra tag state on the processor chip. In coarse grain coherency, coherency between peer LLCs can be maintained using, for example, 1 KB cache lines, instead of the 64 B used between the LLC and cores. In this model, cache misses are more expensive (must move full 1 KB data block), and the chances of cache conflicts (hot sets) is much greater. Both of these phenomena create performance liabilities, while still requiring an on-die tracking structure, just a reduced size structure. In full directory schemes, tracking state is stored in DRAM memory on a per memory line basis (versus a per cache line basis). This solution adds a memory read latency to some flows to allow tracking state to be accessed, having some performance impact, but it requires no additional on-die structure, allows caching at 64 B granularity and puts no limits on how much data is cached in companion processor dies. In some embodiments, apparatus may implement a form of fully directory caching using a single directory state to represent the tag state of companion chips (such as 1 to 7 companion chips).

As described above, in some embodiments, logic device 180 may be an accelerator, accelerator chip, accelerator die, or the like. When the logic device 180 is a companion die in the form of a coherent accelerator die, the die may be attached to the cache hierarchy in the manner of a processor core 122a-n, participating in the cache coherency process managed by core/LLC coherency agent 114a-n, and having its cached lines tracked in the same snoop filter as the processor chip's cores 122a-n. This is advantageous because it allows the coherent accelerator to make use of the processors LLC (or one LLC peer) and it allows the processor's core snoop filter to be used to filter snoops to the accelerator as well, which may be particularly advantageous when the accelerator device has poor snoop latency.

The aforementioned arrangement works well when the accelerator's cache's (for instance, logic device 180 caches 184a-n) size is of the same magnitude of the processor core's 122a-n cache 124a-n. In such a case, each accelerator attachment point requires an amount of snoop filter capacity similar to that of a single core to be added to the associated LLC peer's SF. This is a relatively small adder and exacts a relatively small cost on the overall chip. However, such a configuration may become a problem, similar to the problems with multi-socket systems, when the accelerator's cache is an order of magnitude larger than a processor core's cache (for example, 10 MB) and may be inoperable or substantially inoperable when the accelerator's cache grows by several orders of magnitude, (for example, 10 GB), which has become possible with the advent of memory technologies like multi-channel DRAM (MCDRAM) and high-bandwidth memory (HBM).

Accordingly, apparatus 105 and/or components thereof may be configured to operate cache coherency processes according to some embodiments operative to, among other things, solve the problem of providing coherency state tracking for a chip/agent that interfaces to the cache hierarchy at the Core/LLC Coherency Agent level and which has a cache with is too large to be tracked in the associated LLC peer's SF. For instance, cache coherency processes according to some embodiments may use a mechanism employed by LLC/memory Coherency agent in a full directory or full directory-based scheme with a second field to the full directory in memory, where the first field tracks the caching of a memory line in an LLC peer to inform the LLC/memory coherency agent and the second field tracks the caching of an accelerator agent to inform the core/LLC coherency agent. In various embodiments, one of each type of field may be included so that all LLC peers on all companion processor chips are tracked by a single instance of the first field type, and all accelerators attached to all companion processors in a multi-processor-chip system are tracked by a single instance of the second field type. In some embodiments, N of each field type may be implemented, such that each instance of each field type may map to exactly one logic device 180 (for instance, exactly one companion processor chip, peer LLC, and/or accelerator chip).

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 2:
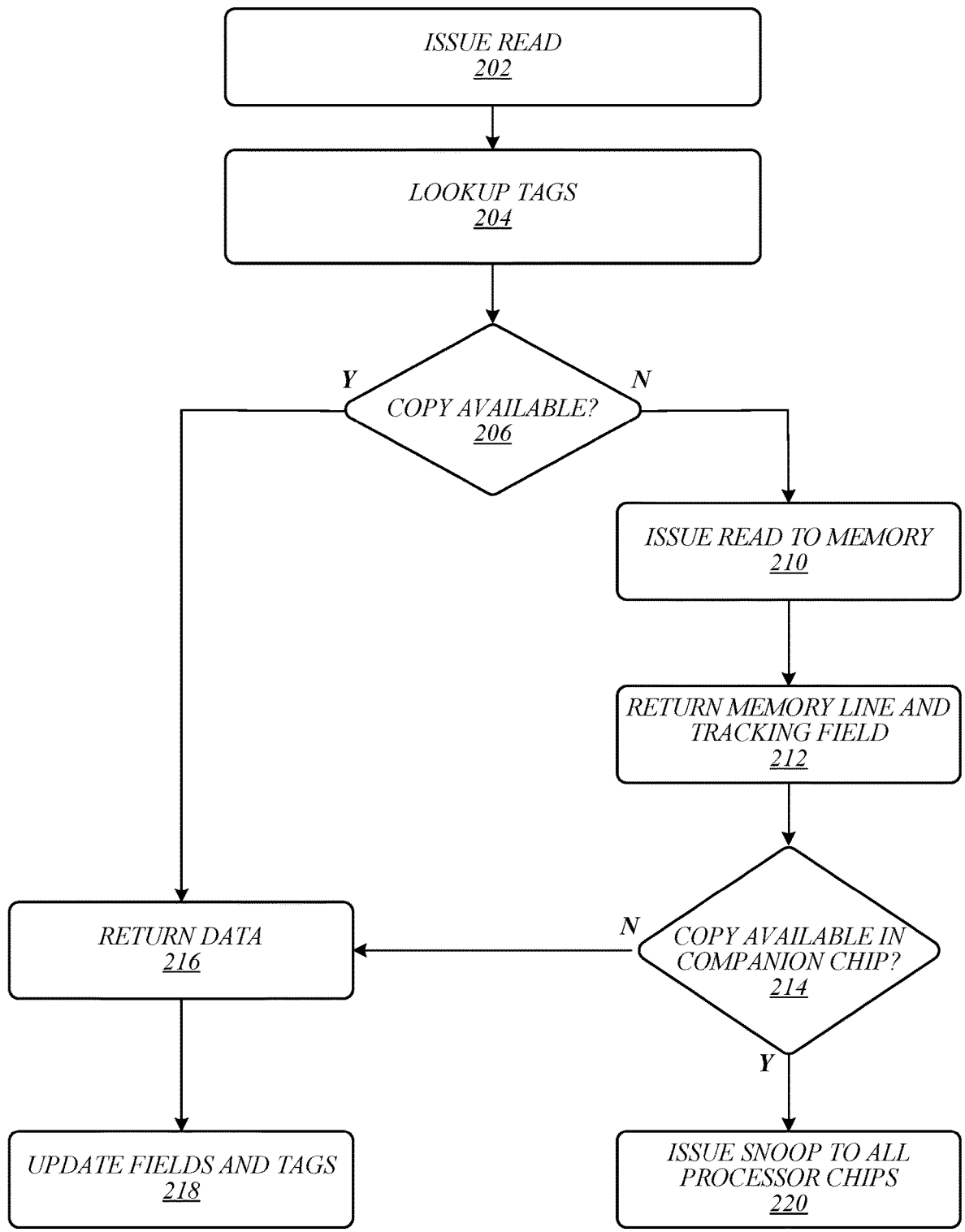
FIG. 2 illustrates an embodiment of a first logic flow.

FIG. 2 illustrates an embodiment of a logic flow 200. Logic flow 200 may be representative of some or all of the operations executed by one or more embodiments described herein, such as apparatus 105, 405, and/or 505 and/or components thereof. In some embodiments, logic flow 200 may be representative of some or all of the operations for a multi-processor chip single processor core read request.

As shown in FIG. 2, logic flow 200 may issue a read at block 202. For instance, one of cores 122a-n may issue a data read. At block 204, logic flow 200 may look up tags for the read. For example, the read process may use the core/LLC memory coherency agent to look up the LLC and SF tags. At block 206, logic flow 200 may determine whether there are copies of the data available. For example, core/LLC memory coherency agent may determine whether there are copies of a line cache in an LLC peer or subordinate processor core based on the LLC tags and SF tags. If logic flow 200 determines that there are available copies of the data at block 206, logic flow 200 may return the data at block 216.

If logic flow 200 determines that there are available copies of the data at block 206, logic flow 200 may issue a read to memory at block 210. For example, core/LLC memory coherency agent may issue a read to DRAM. At block 212, logic flow 200 may return a memory line and a tracking field. For example, DRAM may return a memory line of data and a full directory tracking field. Logic flow 200 may determine whether a copy of the data is available in a companion chip at block 214. For instance, the full directory field may indicate that a companion processor chip may have a copy of the memory line. If logic flow 200 determines that a copy of the data is available in a companion chip at block 214, logic flow 200 may issue a snoop to all processor chips at block 220. For example, LLC/memory coherency agent may issue a snoop to all companion processor chips. If logic flow 200 determines that a copy of the data is not available in a companion chip at block 214, logic flow 200 may return the data to the requesting core at block 216 and update the fields and tags at block 218. For example, the full directory, LLC tags, and SF tags may be updated to record that the memory line is now cached at the requesting core.

Figure 3:
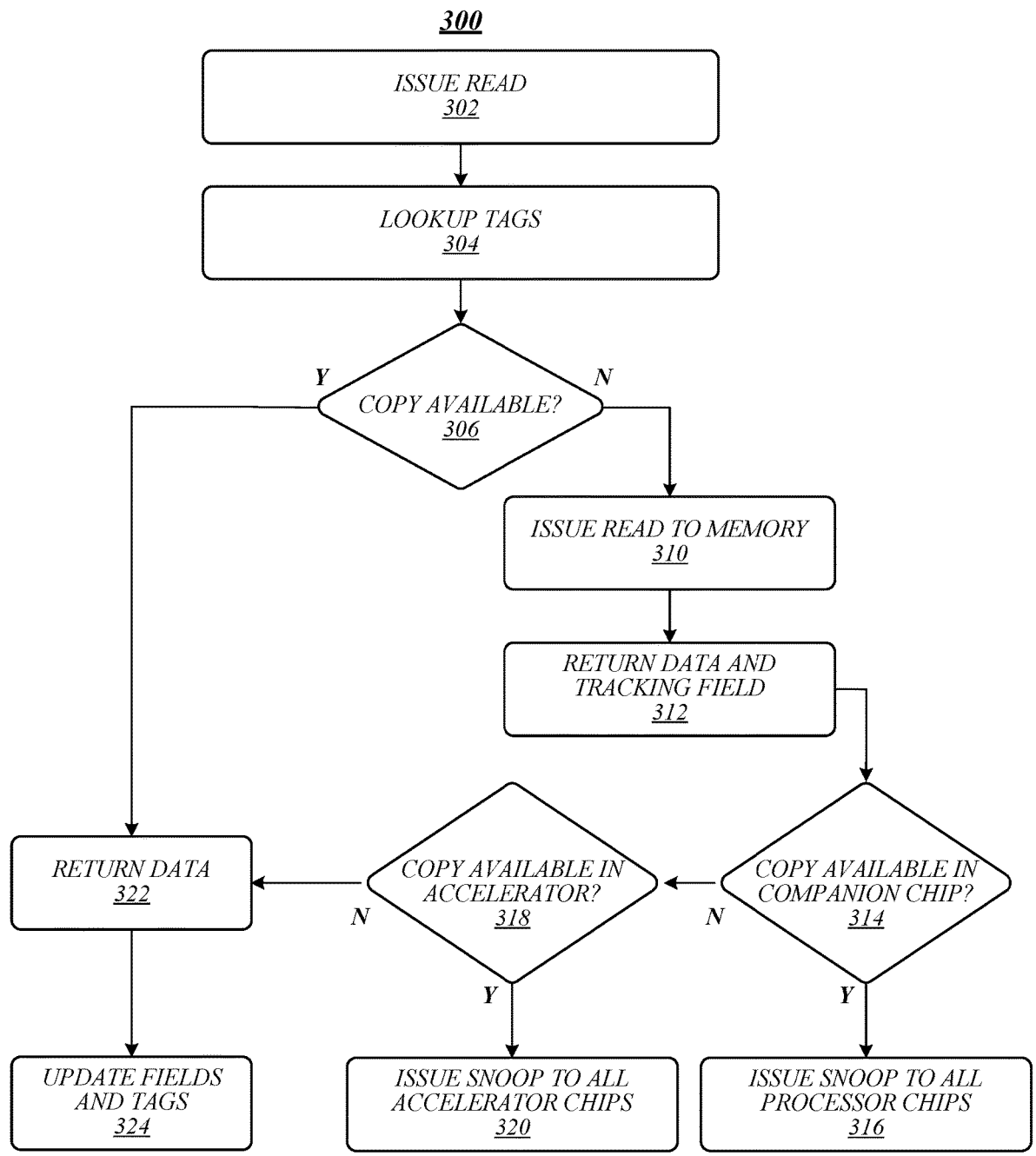
FIG. 3 illustrates an embodiment of a second logic flow.

FIG. 3 illustrates an embodiment of a logic flow 300. Logic flow 300 may be representative of some or all of the operations executed by one or more embodiments described herein, such as apparatus 105, 405, and/or 505 and/or components thereof. In some embodiments, logic flow 300 may be representative of some or all of the operations for a multi-processor chip single processor core read request that includes at least one accelerator chip.

As shown in FIG. 3, logic flow 300 may issue a read at block 302. For instance, one of cores 122a-n may issue a data read. At block 304, logic flow 300 may look up tags for the read. For example, the read process may use the core/LLC memory coherency agent to look up the LLC and SF tags. At block 306, logic flow 300 may determine whether there are copies of the data available. For example, core/LLC memory coherency agent may determine whether there are copies of a line cache in an LLC peer or subordinate processor core based on the LLC tags and SF tags. If logic flow 300 determines that there are available copies of the data at block 306, logic flow 300 may return the data at block 322.

If logic flow 300 determines that there are available copies of the data at block 306, logic flow 300 may issue a read to memory at block 310. For example, core/LLC memory coherency agent may issue a read to DRAM. At block 312, logic flow 300 may return a memory line and a tracking field. For example, DRAM may return a memory line of data and a full directory tracking field. Logic flow 300 may determine whether a copy of the data is available in a companion chip at block 314. For instance, the full directory field may indicate that a companion processor chip may have a copy of the memory line. If logic flow 300 determines that a copy of the data is available in a companion chip at block 314, logic flow 300 may issue a snoop to all processor chips at block 315. For example, LLC/memory coherency agent may issue a snoop to all companion processor chips. If logic flow 300 determines that a copy of the data is not available in a companion chip at block 314, logic flow 300 may determine whether a copy of the data is available in an accelerator chip at block 318. If logic flow 300 determines that a copy of the data is available in an accelerator chip at block 318, logic flow 300 may issue a snoop to all accelerator chips at block 320. If logic flow 200 determines that a copy of the data is not available in a companion processor chip at block 314 and that a copy of the data is not available in a companion accelerator chip at block 314, logic flow 300 may return the data to the requesting core at block 322 and update the fields and tags at block 324.

Figure 4:
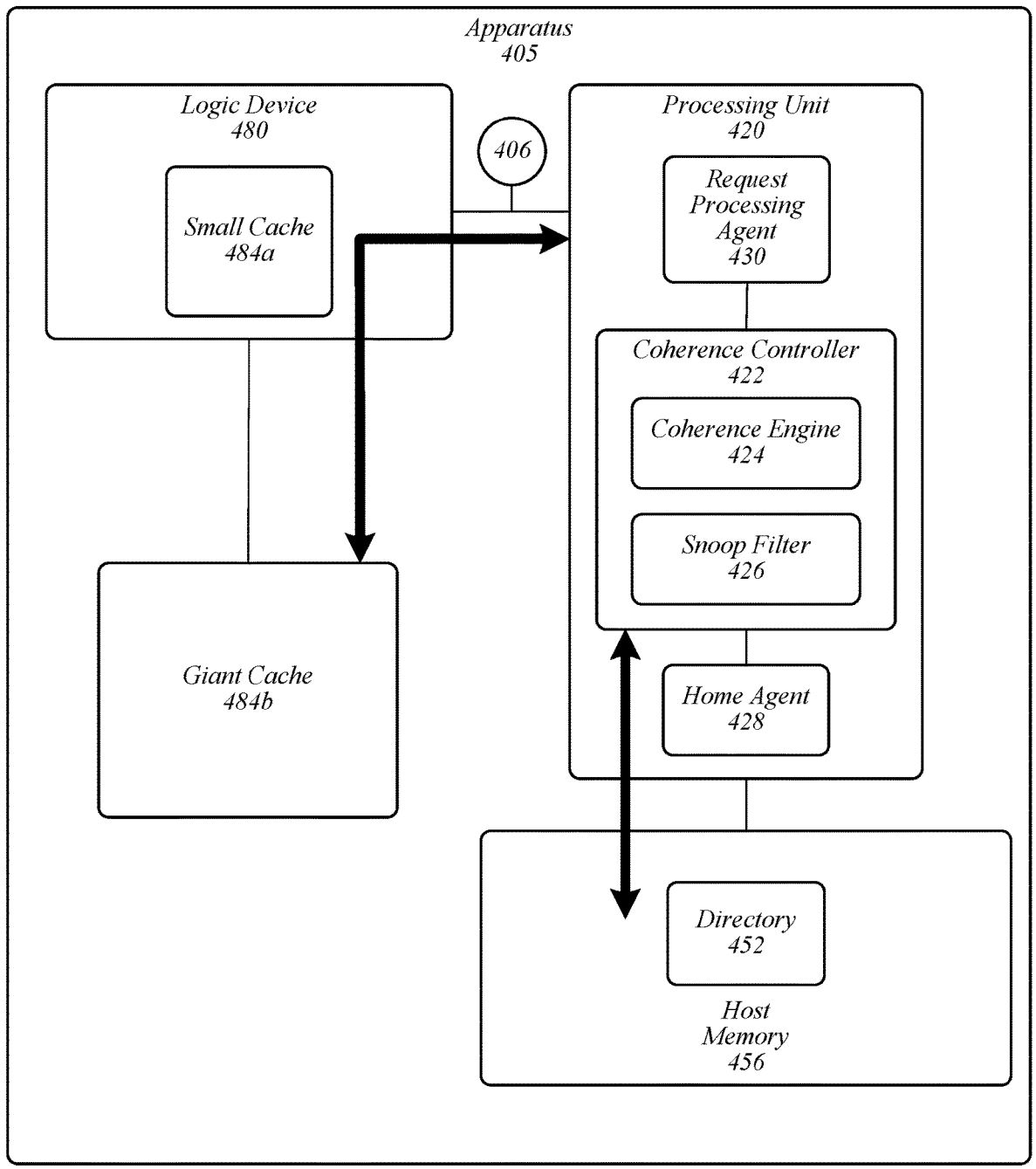
FIG. 4 illustrates an embodiment of a second operating environment.

FIG. 4 illustrates an example of an operating environment 400 that may be representative of various embodiments. The operating environment 400 depicted in FIG. 4 may include an apparatus 405 having a processing unit 420 and a logic device 480. In some embodiments, processing unit may be a CPU and/or may be implemented as a SoC. In various embodiments, logic device 480 may include an accelerator, I/O device, smart I/O device, and/or the like. Logic device 480 may include attached or directly attached memory. In various embodiments, logic device 480 may use at least a portion of the directly attached memory as one or more caches. For instance, logic device 480 may include and/or be operatively coupled to directly attached memory operative as one or more caches, such as small cache 484a and/or giant cache 484b. In some embodiments, small cache 484a may include a small type cache and giant cache 484b may include a giant type cache.

Logic device 480 may be coupled to processing unit 420 via one or more interfaces, including, without limitation, a coherence interface or bus (for example, a "request bus") 406. In some embodiments, logic device 480 may be coupled directly to processing unit via bus 406. In various embodiments, logic device 480 may be coupled to processing unit 420 via bus 406 through a coherent fabric (such as coherent fabric 130). In some embodiments, logic device 480 may be in communication with a coherence controller 422 of processing unit 420. Coherence controller 422 may include various components to implement cache coherency within apparatus 405. For example, coherence controller 422 may include a home agent 428, a coherence engine 424, snoop filter 426 (or directory), and/or the like. Processing unit 420 may include a request processing agent 430 configured to process memory operation requests from logic device 480 or other elements (for instance, caching agents 128). In some embodiments, request processing agent 430 may be a component of a coherent fabric (for instance, coherent fabric 130), for example, operative as an interface for link 406. In general, a memory operation request may include a request for processing unit 420 to perform a memory operation (for instance, read, write, and/or the like).

In some embodiments embodiment, when a request for a memory operation arrives at coherence controller 422, coherence engine 424 may determine where to forward the request. A memory operation may general refer to a transaction that requires access to host memory 456 or any of caches 484a, 484b, and/or a processing unit cache (not shown). In some embodiments, host memory 456 may include a directory 452. Coherence engine 424 may perform a look-up in snoop filter 426 or directory 452 to determine whether snoop filter 426 or directory 452 has directory information of the requested line. In some embodiments, snoop filter 426 may be a "sparse" or "partial" directory operative to maintain a partial directory (for instance, of directory 452). For example, directory information in snoop filter 426 may track all caches in the system, while directory 452 may track the entire or essentially the entire physical address space in the system. For example, directory information in snoop filter 426 may indicate caches (such as cache 484a, 484b, cache 124a-n, cache 126, and/or the like) that have a copy of a cache block associated with a memory operation request. In general, snoop filters can be utilized to avoid sending unnecessary snoop traffic and thereby remove snoop traffic from the critical path and reduce the amount of traffic and cache activity in the overall system. In various embodiments, snoop filter 426 and/or directory 452 may be an array organized in set-associative ways where each entry of the way may contain one or more valid bits (depending on configuration—either line or region based), agent class bits and a tag field. In one embodiment, a valid bit indicates whether the corresponding entry has valid information and the agent status bits are used to indicate if the cache line is present in the corresponding caching agent, and the tag field is use to save the tag of the cache line. In one embodiment, the agent class bits are configured to indicate a class of agent associated with a cache line and/or memory operation.

If snoop filter 426 and/or directory 452 has directory information, coherence engine 424 forwards the request to the cache that has a current copy of the line based on the presence vector of the line. If the transaction might potentially change the state of the requested line, coherence engine 424 updates the directory information in snoop filter 426 and/or directory 452 to reflect the changes. If snoop filter 426 and/or directory 452 does not have information for the line, coherence engine 424 may add an entry to snoop filter 426 and/or directory 452 to record directory information of the requested line. In some embodiments, directory information may include cache status information indicating a type of memory operation, cache coherence process, coherence operation, and/or the like. For instance, cache status information may indicate whether a cache coherence process is to support a giant cache type, a small cache type, and/or the like. In some embodiments, logic device 480 and/or coherence controller 422 may be operative to specify the cache status information associated with an entry in the snoop filter 426 and/or directory 452. For example, entries in snoop filter 426 and/or directory 452 associated with cache lines of small cache 484a may include cache status information indicating a small cache status. In another example, entries in snoop filter 426 and/or directory 452 associated with cache lines of giant cache 484b may include cache status information indicating a giant cache status. In this manner, logic device 480, in combination with coherence controller 422, may support both small cache 484a and giant cache 484b using the same hardware and/or software architecture.

In some embodiments, agent class qualifiers may be included and/or determined from logic device 480 memory requests on the bus 406 (as a request bus). In various embodiments, agent class qualifiers on bus 406 during a read request or a write request from logic device 480 may specify which of two levels of coherence support are requires by logic device for a particular request, including giant cache type support or small cache type support. Accordingly, in various embodiments, memory operation requests generated by logic device 480, processor cores (for instance, processor cores 122a-n), caching agents 128, and/or other elements, may include agent class qualifiers configured to specify the agent class to be used for the particular memory operation. In some embodiments, elements sending memory requests, such as logic device 480 (for instance, operating as an accelerator, I/O device, and/or the like) may modulate the active class on a request-by-request basis, allowing a single logic device 480 to employ one or more small caches and one or more giant caches.

In some embodiments, a data requestor (for instance, logic device 480) may transmit a data request over bus 406. The data request may include data request information, such as data, a memory address, cache status information, and/or the like. In various embodiments, cache status information may indicate an agent class associated with the request, such as whether the request is associated with a giant cache status or a small cache status. For example, memory requests from logic device 480 associated with small cache 484*a* may include cache status information indicating a small cache status, and memory requests from logic device 480 associated with giant cache 484*b* may include cache status information indicating a giant cache status.

Request processing agent 430 may receive or otherwise access memory requests and determine cache status information from the memory requests. In some embodiments, for requests indicating a small cache status, request processing agent 430 may perform, cause to be performed, and/or instruct coherence controller 422 to operate a small cache coherence process, for instance, using flows that invoke or use the on-die snoop filter 426 of processing unit 420 and the directory field associated with small cache status. In various embodiments, for requests indicating a giant cache status, request processing agent 430 may perform, cause to be performed, and/or instruct coherence controller 422 to operate a giant cache coherence process instruct coherence controller 422 to operate using flows that invoke the directory field associated with giant cache status, for instance, with directory 452.

In some embodiments, responsive to a directory state for an access to a cache line, coherence controller 422 may forward snoop messages directly to logic device 480 responsive to determining a giant cache status (and, therefore, giant cache coherence process active) associated with a memory operation indicates that logic device 480 may have a cached copy of the associated cache line. In various embodiments, responsive to a directory state for an access to a cache line, coherence controller 422 may forward snoop messages directly to on-die processor snoop filters 426 when the small cache status indicates a small cache agent may have a cached copy of the cache line associated with a memory operation (and, therefore, the small cache coherence process is active). In some embodiments, coherence controller 422 at the on-die snoop filter 426 may forward snoops to logic device 480 if the on-die snoop filter indicates that logic device 480 may have a cached copy of the cache line associated with a memory operation.

Figure 5:
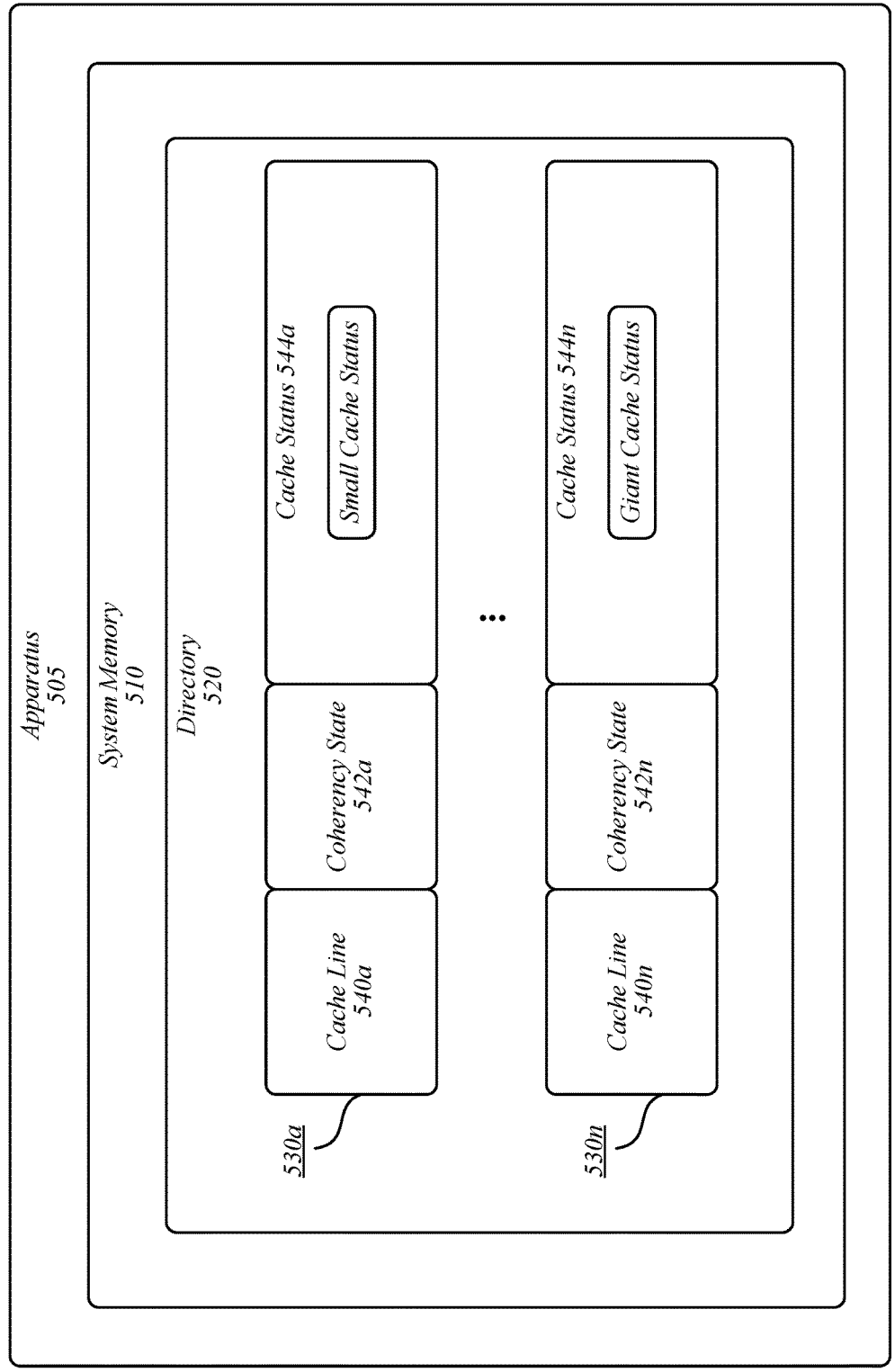
FIG. 5 illustrates an embodiment of a third operating environment.

FIG. 5 illustrates an example of an operating environment 500 that may be representative of various embodiments. The operating environment 500 depicted in FIG. 5 may include an apparatus 505 having a system memory 510 storing a directory 520. Directory 520 may include one or more entries 530*a-n*. In some embodiments, each entry 530*a-n* may correspond with a cache line of data stored in a cache of apparatus 505 (for example, caches 124*a-n*, LLC 126, caches 184*a-n*, and/or the like). Each entry 530*a-n* may include directory information, such as cache line information 540*a-n* (for instance, indicating a cache line and/or physical memory address associated with entry 530*a-n*), coherency state 542*a-n* (for instance, invalid, locked, owned, modified, exclusive, shared, forward, and/or the like), and/or cache status 544*a-n*. In various embodiments, cache status 544*a-n* may indicate whether a cache entry 530*a-n* is associated with a small cache status (and, therefore, a small cache type) or a giant cache status (and, therefore, a giant cache type).

In some embodiments, for each memory operation, a coherence controller (such as coherence controller 422) may access entries 530*a-n* of directory 520 to determine the cache status. For instance, the coherence controller may determine the cache status to perform the corresponding cache coherence process. For instance, for a read operation, the coherence controller may perform a giant cache coherence process responsive to determining that the cache status 544*a-n* is a giant cache status, and the coherence controller may perform a small cache coherence process responsive to determining that the cache status 544*a-n* is a small cache status. In another instance, for a write operation, the cache status may be determined from the memory operation request and the corresponding cache status 544*a-n* may be written in a new entry 530*a-n* if a previous entry does not exist for the associated cache line or the cache status 544*a-n* may be updated to correspond with the cache status specified in the memory operation request.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
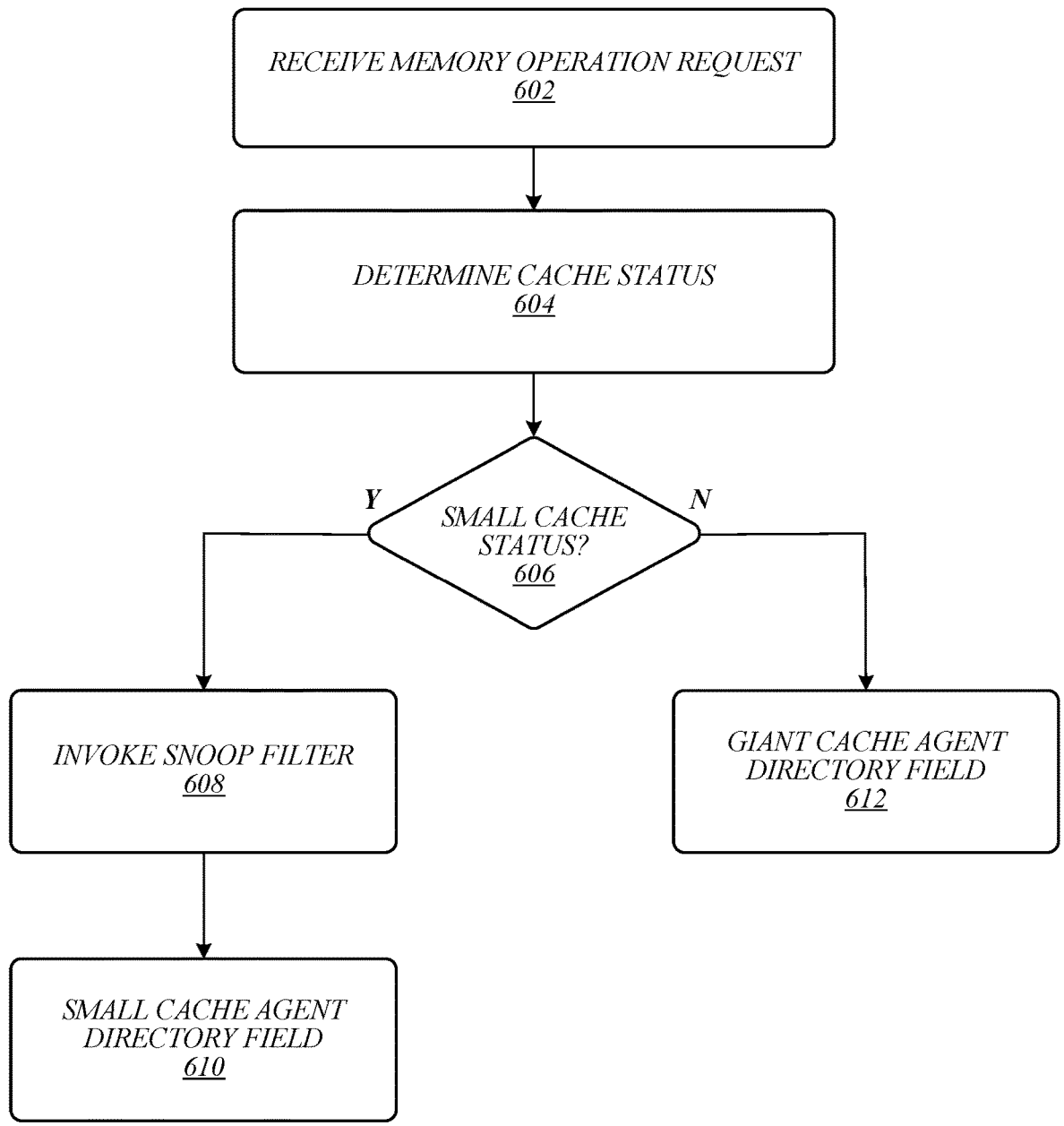
FIG. 6 illustrates an embodiment of a third logic flow.

FIG. 6 illustrates an embodiment of a logic flow 600. Logic flow 600 may be representative of some or all of the operations executed by one or more embodiments described herein, such as apparatus 105, 405, and/or 605. In some embodiments, logic flow 600 may be representative of some or all of the operations for a cache coherence process according to some embodiments.

As shown in FIG. 6, logic flow 600 may receive a memory operation request at block 602. For example, request processing agent 430 may receive or otherwise access memory requests and determine cache status information from the memory requests. At block 604, logic flow 600 may determine a cache status associated with the memory operation request. For example, request processing agent 430 may determine whether the memory operation requests is associated with a giant cache status or a small cache status. In various embodiments, agent class qualifiers on bus 406 during a read request or a write request from logic device 480 may specify which of two levels of coherence support are requires by logic device for a particular request, including giant cache type support or small cache type support. In various embodiments, memory operation requests generated by logic device 480, processor cores (for instance, processor cores 122*a-n*), caching agents 128, and/or other elements, may include agent class qualifiers configured to specify the agent class to be used for the particular memory operation If determination block 606 determines that the cache status is a small cache status, logic flow 600 may invoke the snoop filter at block 608 and use the directory field associated with the small cache status. For example, for requests indicating a small cache status, request processing agent 430 may instruct coherence controller 422 to operate using flows that invoke the on-die snoop filter 426 of processing unit 420 and the directory field associated with small cache status.

If determination block 606 determines that the cache status is a giant cache status, logic flow 600 may invoke the directory field associated with the giant cache status. For example, for requests indicating a giant cache status, request processing agent 430 may instruct coherence controller 422 to operate using flows that invoke the directory field associated with giant cache status, for instance, with directory 452.

Figure 7:
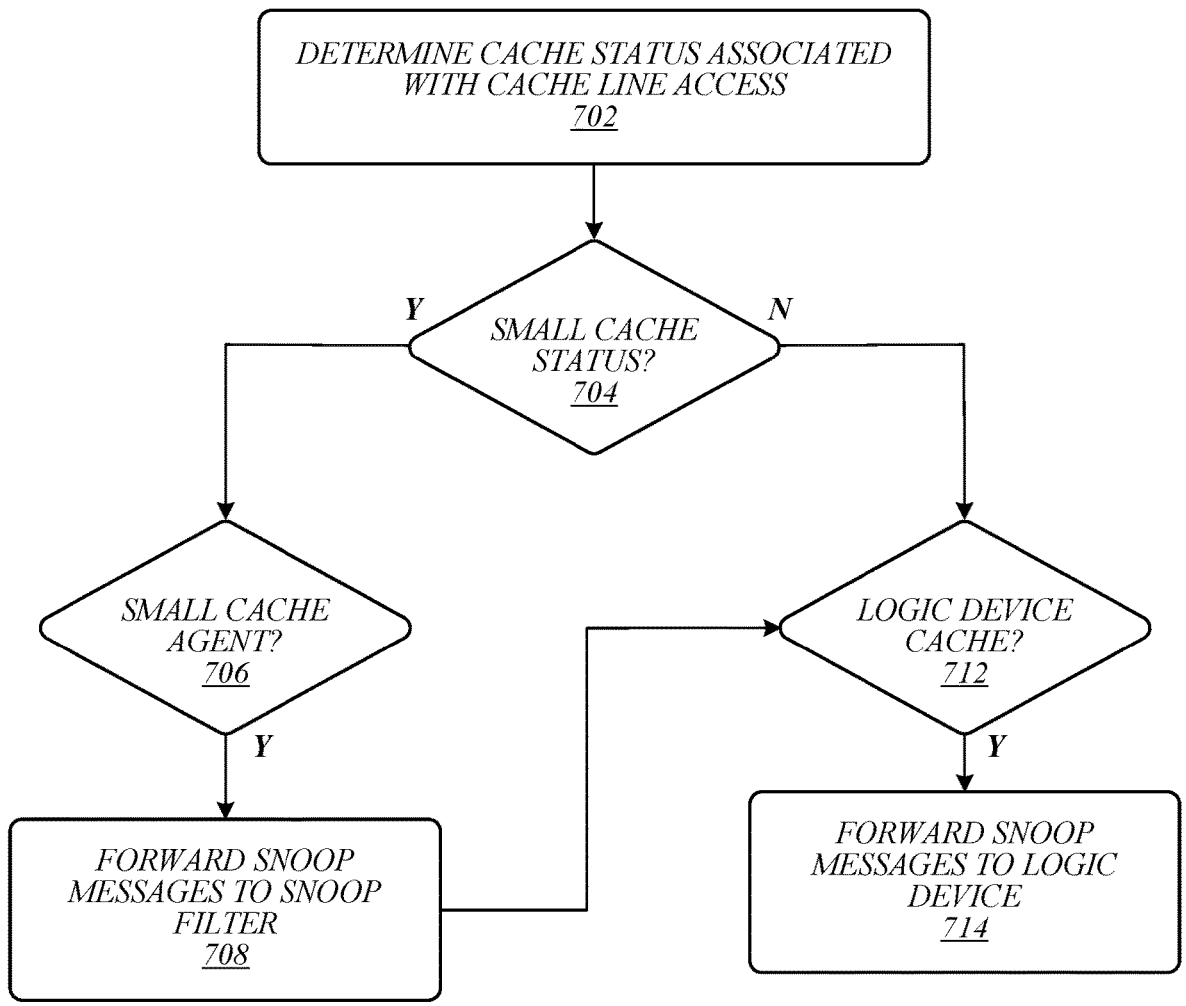
FIG. 7 illustrates an embodiment of a fourth logic flow.

FIG. 7 illustrates an embodiment of a logic flow 700. Logic flow 700 may be representative of some or all of the operations executed by one or more embodiments described herein, such as apparatus 105, 405, and/or 505. In some embodiments, logic flow 700 may be representative of some or all of the operations for a cache coherence process according to some embodiments.

As shown in FIG. 7, logic flow 700 may determine a cache status associated with a cache line access at block 702. For example, in some embodiments, for each memory operation, a coherence controller (such as coherence controller 422) may access entries 530a-n of directory 520 to determine the cache status. If determination block 704 determines that the cache status is a small cache status, logic flow 700 may determine whether a small cache agent may have a cached copy of the cache line associated with a memory operation at determination block 706. If a small cache agent has a copy of the cache line as indicated by determination block 706, snoop messages may be forwarded to snoop filter at block 708. For example, responsive to a directory state for an access to a cache line, coherence controller 422 may forward snoop messages directly to on-die processor snoop filters 426 when the small cache status indicates a small cache agent may have a cached copy of the cache line associated with a memory operation. If the snoop filter indicates that a giant cache agent of a logic device may have a cached copy of the cache line associated with a memory operation at determination block 712, snoop messages may be forwarded to the logic device at block 714. For example, coherence controller 422 at the on-die snoop filter 426 may forward snoops to logic device 480 if the on-die snoop filter indicates that logic device 480 may have a cached copy of the cache line associated with a memory operation.

If determination block 704 determines that the cache status is a giant cache status, logic flow 700 may determine whether a logic device cache (for instance, a giant cache device) may have a cached copy of the cache line associated with a memory operation at determination block 712. If logic flow 700 determines that a logic device cache may have a cached copy of the cache line at block 712, logic flow 700 may forward snoop messages to logic device at block 714. For instance, coherence controller 422 at the on-die snoop filter 426 may forward snoops to logic device 480 if the on-die snoop filter indicates that logic device 480 may have a cached copy of the cache line associated with a memory operation.

Figure 8:
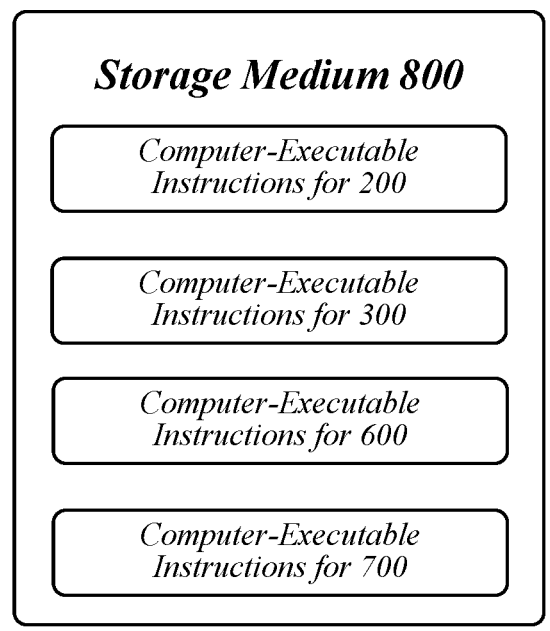
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 100, 200, 600, and/or logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
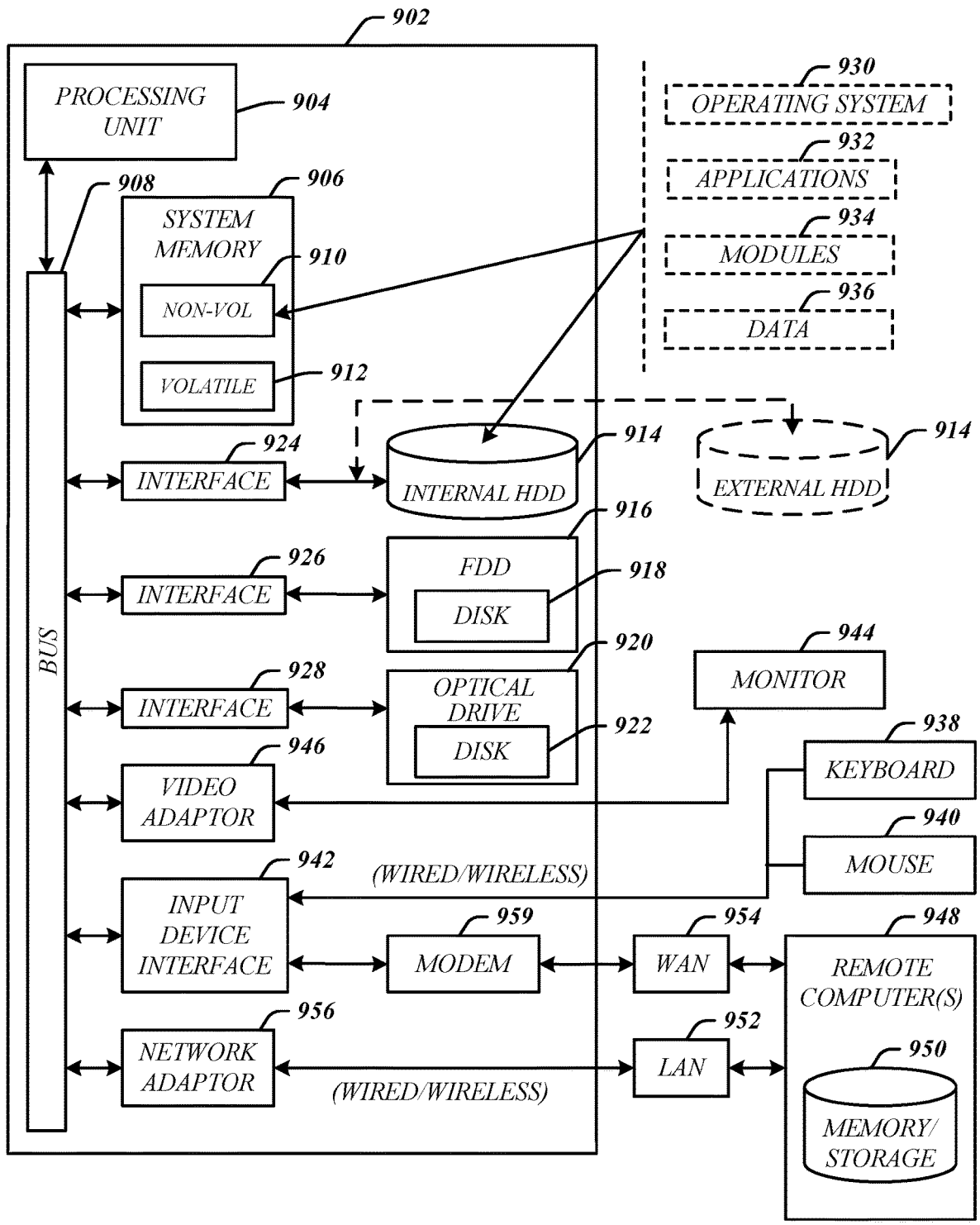
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of apparatus 105, 405, and/or 505. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 999. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel®

Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 999 provides an interface for system components including, but not limited to, the system memory 906 to the processing unit 904. The system bus 999 can be any of several types of bus structure that may further interconnect to a memory bus (with or without a memory controller), a peripheral bus, and a local bus using any of a variety of commercially available bus architectures. Interface adapters may connect to the system bus 999 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 919, and an optical disk drive 920 to read from or write to a removable optical disk 922 (e.g., a CD-ROM or DVD). The HDD 914, FDD 916 and optical disk drive 920 can be connected to the system bus 999 by a HDD interface 924, an FDD interface 926 and an optical drive interface 929, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of apparatus 105, 305, 405, and/or 505.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 999, but can be connected by other interfaces such as a parallel port, IEEE 1394 serial port, a game port, a USB port, an IR interface, and so forth.

A monitor 944 or other type of display device is also connected to the system bus 999 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 959, or is connected to a communications server on the WAN 954, or has other means for establishing communications over the WAN 954, such as by way of the Internet. The modem 959, which can be internal or external and a wire and/or wireless device, connects to the system bus 999 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 902 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus comprising at least one processor, at least one cache memory, and logic, at least a portion comprised in hardware, the logic to receive a memory operation request associated with the at least one cache memory, determine a cache status of the memory operation request, the cache status indicating one of a giant cache status or a small cache status, perform the memory operation request via a small cache coherence process responsive to a determination that the cache status is a small cache status, and perform the memory operation request via a giant cache coherence process responsive to the determination that the cache status is a small cache status.

Example 2 is the apparatus of Example 1, the at least one cache memory comprising at least one small cache and at least one giant cache.

Example 3 is the apparatus of Example 1, the at least one cache memory comprising at least one giant cache having a memory size greater than 1 gigabyte (GB).

Example 4 is the apparatus of Example 1, the at least one cache memory comprising at least one small cache having a memory size of less than or equal to 10 megabytes (MB).

Example 5 is the apparatus of Example 1, further comprising a logic device, the at least one cache memory operably coupled to the logic device.

Example 6 is the apparatus of Example 1, further comprising an accelerator, the at least one cache memory operably coupled to the accelerator.

Example 7 is the apparatus of Example 1, further comprising a system memory storing a directory comprising cache status information to indicate whether the at least one cache memory is a giant cache or a small cache.

Example 8 is the apparatus of Example 1, further comprising a coherence controller having a snoop filter, the snoop filter comprising cache status information to indicate whether the at least one cache memory is a giant cache or a small cache.

Example 9 is the apparatus of Example 1, the logic to specify the cache status of the memory operation request via an agent class qualifier of the memory operation request.

Example 10 is the apparatus of Example 1, the logic to use a snoop filter to perform the small cache coherence process.

Example 11 is the apparatus of Example 1, the logic to use a directory field to perform the giant cache coherence process.

Example 12 is the apparatus of Example 1, the memory operation request comprising a request to access a cache line, the cache status indicating the small cache status based on a copy of the cache line being stored in a small cache agent.

Example 13 is the apparatus of Example 1, the memory operation request comprising a request to access a cache line, the cache status indicating the giant cache status based on a copy of the cache line being stored in a giant cache agent.

Example 14 is a system, comprising the apparatus according to any of claims 1-13, and at least one transceiver.

Example 15 is a method comprising receiving a memory operation request associated with at least one cache memory, determining a cache status of the memory operation request, the cache status indicating one of a giant cache status or a small cache status, performing the memory operation request via a small cache coherence process responsive to the cache status being a small cache status, and performing the memory operation request via a giant cache coherence process responsive to the cache status being a small cache status.

Example 16 is the method of Example 15, the at least one cache memory comprising at least one small cache and at least one giant cache.

Example 17 is the method of Example 15, the at least one cache memory comprising at least one giant cache having a memory size greater than 1 gigabyte (GB).

Example 18 is the method of Example 15, the at least one cache memory comprising at least one small cache having a memory size of less than or equal to 10 megabytes (MB).

Example 19 is the method of Example 15, the at least one cache memory operably coupled to a logic device of the computing device.

Example 20 is the method of Example 15, the at least one cache memory operably coupled to an accelerator of the computing device.

Example 21 is the method of Example 15, comprising storing a directory comprising cache status information to indicate whether the at least one cache memory is a giant cache or a small cache.

Example 22 is the method of Example 15, further comprising providing a snoop filter stored in a coherence controller of the computing device, the snoop filter comprising cache status information to indicate whether the at least one cache memory is a giant cache or a small cache.

Example 23 is the method of Example 15, comprising specifying the cache status of the memory operation request via an agent class qualifier of the memory operation request.

Example 24 is the method of Example 15, comprising using a snoop filter to perform the small cache coherence process.

Example 25 is the method of Example 15, comprising using a directory field to perform the giant cache coherence process.

Example 26 is the method of Example 15, the memory operation request comprising a request to access a cache line, the cache status indicating the small cache status based on a copy of the cache line being stored in a small cache agent.

Example 27 is the method of Example 15, the memory operation request comprising a request to access a cache line, the cache status indicating the giant cache status based on a copy of the cache line being stored in a giant cache agent.

Example 28 is a computer-readable storage medium that stores instructions for execution by processing circuitry of a computing device, the instructions to cause the computing device to receive a memory operation request associated with at least one cache memory, determine a cache status of the memory operation request, the cache status indicating one of a giant cache status or a small cache status, perform the memory operation request via a small cache coherence process responsive to a determination that the cache status is a small cache status, and perform the memory operation request via a giant cache coherence process responsive to the determination that the cache status is a small cache status.

Example 29 is the computer-readable storage medium of Example 28, the at least one cache memory comprising at least one small cache and at least one giant cache.

Example 30 is the computer-readable storage medium of Example 28, the at least one cache memory comprising at least one giant cache having a memory size greater than 1 gigabyte (GB).

Example 31 is the computer-readable storage medium of Example 28, the at least one cache memory comprising at least one small cache having a memory size of less than or equal to 10 megabytes (MB).

Example 32 is the computer-readable storage medium of Example 28, the at least one cache memory operably coupled to a logic device of the computing device.

Example 33 is the computer-readable storage medium of Example 28, the at least one cache memory operably coupled to an accelerator of the computing device.

Example 34 is the computer-readable storage medium of Example 28, the instructions to cause the computing device to store a directory comprising cache status information to indicate whether the at least one cache memory is a giant cache or a small cache.

Example 35 is the computer-readable storage medium of Example 28, the instructions to cause the computing device to provide a snoop filter stored in a coherence controller of the computing device, the snoop filter comprising cache status information to indicate whether the at least one cache memory is a giant cache or a small cache.

Example 36 is the computer-readable storage medium of Example 28, the instructions to cause the computing device to specify the cache status of the memory operation request via an agent class qualifier of the memory operation request.

Example 37 is the computer-readable storage medium of Example 28, the instructions to cause the computing device to use a snoop filter to perform the small cache coherence process.

Example 38 is the computer-readable storage medium of Example 28, the instructions to cause the computing device to use a directory field to perform the giant cache coherence process.

Example 39 is the computer-readable storage medium of Example 28, the memory operation request comprising a request to access a cache line, the cache status indicating the small cache status based on a copy of the cache line being stored in a small cache agent.

Example 40 is the computer-readable storage medium of Example 28, the memory operation request comprising a request to access a cache line, the cache status indicating the giant cache status based on a copy of the cache line being stored in a giant cache agent.

Example 41 is an apparatus comprising at least one cache memory means, and a memory operation management means to receive a memory operation request associated with the at least one cache memory, determine a cache status of the memory operation request, the cache status indicating one of a giant cache status or a small cache status, perform the memory operation request via a small cache coherence process responsive to a determination that the cache status is a small cache status, and perform the memory operation request via a giant cache coherence process responsive to the determination that the cache status is a small cache status.

Example 42 is the apparatus of Example 41, the at least one cache memory comprising at least one small cache and at least one giant cache.

Example 43 is the apparatus of Example 41, the at least one cache memory comprising at least one giant cache having a memory size greater than 1 gigabyte (GB).

Example 44 is the apparatus of Example 41, the at least one cache memory comprising at least one small cache having a memory size of less than or equal to 10 megabytes (MB).

Example 45 is the apparatus of Example 41, further comprising a logic device means, the at least one cache memory means operably coupled to the logic device means.

Example 46 is the apparatus of Example 41, further comprising an accelerator means, the at least one cache memory means operably coupled to the accelerator means.

Example 47 is the apparatus of Example 41, further comprising a system memory means storing a directory comprising cache status information to indicate whether the at least one cache memory means is a giant cache or a small cache.

Example 48 is the apparatus of Example 41, further comprising a coherence controller means having a snoop filter, the snoop filter comprising cache status information to indicate whether the at least one cache memory means is a giant cache or a small cache.

Example 49 is the apparatus of Example 41, the memory operation management means to specify the cache status of the memory operation request via an agent class qualifier of the memory operation request.

Example 50 is the apparatus of Example 41, the memory operation management means to use a snoop filter to perform the small cache coherence process.

Example 51 is the apparatus of Example 41, the memory operation management means to use a directory field to perform the giant cache coherence process.

Example 52 is the apparatus of Example 41, the memory operation request comprising a request to access a cache line, the cache status indicating the small cache status based on a copy of the cache line being stored in a small cache agent.

Example 53 is the apparatus of Example 41, the memory operation request comprising a request to access a cache line, the cache status indicating the giant cache status based on a copy of the cache line being stored in a giant cache agent.

Example 54 is a system, comprising the apparatus according to any of claims 41-53, and at least one transceiver.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   at least one processor;
   at least one cache memory;
   at least one system memory to store a directory comprising cache status information to indicate whether the at least one cache memory is a giant cache or a small cache; and
   logic, at least a portion comprised in hardware, the logic to:
   receive a memory operation request associated with the at least one cache memory,
   determine a cache status of the memory operation request, the cache status indicating one of a giant cache status or a small cache status,
   perform the memory operation request via a small cache coherence process responsive to a determination that the cache status is a small cache status, and
   perform the memory operation request via a giant cache coherence process responsive to the determination that the cache status is a giant cache status.

2. The apparatus of claim 1, the at least one cache memory comprising at least one small cache and at least one giant cache.

3. The apparatus of claim 1, the at least one cache memory comprising at least one giant cache having a memory size greater than 1 gigabyte (GB).

4. The apparatus of claim 1, the at least one cache memory comprising at least one small cache having a memory size of less than or equal to 10 megabytes (MB).

5. The apparatus of claim 1, further comprising a logic device, the at least one cache memory operably coupled to the logic device.

6. The apparatus of claim 1, further comprising an accelerator, the at least one cache memory operably coupled to the accelerator.

7. The apparatus of claim 1, the logic to specify the cache status of the memory operation request via an agent class qualifier of the memory operation request.

8. The apparatus of claim 1, the logic to use a snoop filter to perform the small cache coherence process.

9. The apparatus of claim 1, the logic to use a directory field to perform the giant cache coherence process.

10. The apparatus of claim 1, the memory operation request comprising a request to access a cache line, the cache status indicating the small cache status based on a copy of the cache line being stored in a small cache agent.

11. The apparatus of claim 1, the memory operation request comprising a request to access a cache line, the cache status indicating the giant cache status based on a copy of the cache line being stored in a giant cache agent.

12. An apparatus, comprising:
   at least one processor;
   at least one cache memory;
   a coherence controller having a snoop filter, the snoop filter comprising cache status information to indicate whether the at least one cache memory is a giant cache or a small cache; and
   logic, at least a portion comprised in hardware, the logic to:
   receive a memory operation request associated with the at least one cache memory,
   determine a cache status of the memory operation request, the cache status indicating one of a giant cache status or a small cache status,
   perform the memory operation request via a small cache coherence process responsive to a determination that the cache status is a small cache status, and
   perform the memory operation request via a giant cache coherence process responsive to the determination that the cache status is a giant cache status.

13. A method, comprising:
   storing a directory comprising cache status information to indicate whether at least one cache memory is a giant cache or a small cache;
   receiving a memory operation request associated with the at least one cache memory;

determining a cache status of the memory operation request, the cache status indicating one of a giant cache status or a small cache status;

performing the memory operation request via a small cache coherence process responsive to the cache status being a small cache status; and performing the memory operation request via a giant cache coherence process responsive to the cache status being a giant cache status.

14. The method of claim 13, the at least one cache memory comprising at least one small cache and at least one giant cache.

15. The method of claim 13, the at least one cache memory comprising at least one giant cache having a memory size greater than 1 gigabyte (GB).

16. The method of claim 13, the at least one cache memory comprising at least one small cache having a memory size of less than or equal to 10 megabytes (MB).

17. The method of claim 13, the memory operation request comprising a request to access a cache line, the cache status indicating the small cache status based on a copy of the cache line being stored in a small cache agent.

18. A method, comprising:

providing a snoop filter stored in a coherence controller of a computing device, the snoop filter comprising cache status information to indicate whether at least one cache memory is a giant cache or a small cache;

receiving a memory operation request associated with the at least one cache memory;

determining a cache status of the memory operation request, the cache status indicating one of a giant cache status or a small cache status;

performing the memory operation request via a small cache coherence process responsive to the cache status being a small cache status; and performing the memory operation request via a giant cache coherence process responsive to the cache status being a giant cache status.

19. A non-transitory computer-readable storage medium that stores instructions for execution by processing circuitry of a computing device, the instructions to cause the computing device to:

store a directory comprising cache status information to indicate whether at least one cache memory is a giant cache or a small cache;

receive a memory operation request associated with the at least one cache memory;

determine a cache status of the memory operation request, the cache status indicating one of a giant cache status or a small cache status;

perform the memory operation request via a small cache coherence process responsive to a determination that the cache status is a small cache status; and perform the memory operation request via a giant cache coherence process responsive to the determination that the cache status is a giant cache status.

20. The computer-readable storage medium of claim 19, the at least one cache memory comprising at least one small cache and at least one giant cache.

21. The computer-readable storage medium of claim 19, the at least one cache memory comprising at least one giant cache having a memory size greater than 1 gigabyte (GB).

22. The computer-readable storage medium of claim 19, the at least one cache memory comprising at least one small cache having a memory size of less than or equal to 10 megabytes (MB).

23. A non-transitory computer-readable storage medium that stores instructions for execution by processing circuitry of a computing device, the instructions to cause the computing device to:

provide a snoop filter stored in a coherence controller of the computing device, the snoop filter comprising cache status information to indicate whether at least one cache memory is a giant cache or a small cache;

receive a memory operation request associated with the at least one cache memory;

determine a cache status of the memory operation request, the cache status indicating one of a giant cache status or a small cache status;

perform the memory operation request via a small cache coherence process responsive to a determination that the cache status is a small cache status; and perform the memory operation request via a giant cache coherence process responsive to the determination that the cache status is a giant cache status.

* * * * *